US 8,645,612 B2

(12) United States Patent
Kunimatsu et al.

(10) Patent No.: US 8,645,612 B2
(45) Date of Patent: Feb. 4, 2014

(54) INFORMATION PROCESSING DEVICE AND INFORMATION PROCESSING METHOD

(75) Inventors: Atsushi Kunimatsu, Funabashi (JP); Goh Uemura, Kawasaki (JP); Tsutomu Owa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 149 days.

(21) Appl. No.: 13/076,952

(22) Filed: Mar. 31, 2011

(65) Prior Publication Data

US 2012/0030405 A1    Feb. 2, 2012

(30) Foreign Application Priority Data

Jul. 30, 2010   (JP) ................................. 2010-172048

(51) Int. Cl.
*G06F 13/16*   (2006.01)

(52) U.S. Cl.
USPC ............... 711/6; 711/118; 711/119; 718/104; 718/108

(58) Field of Classification Search
USPC .................. 711/6, 118, 119; 718/104, 108
See application file for complete search history.

(56) References Cited

U.S. PATENT DOCUMENTS

| | | | |
|---|---|---|---|
| 6,587,937 | B1 | 7/2003 | Jensen et al. |
| 7,755,950 | B2 * | 7/2010 | Yu et al. .................. 365/185.28 |
| 2005/0132363 | A1 * | 6/2005 | Tewari et al. ..................... 718/1 |
| 2006/0242641 | A1 * | 10/2006 | Kinsey et al. ..................... 718/1 |
| 2007/0285980 | A1 | 12/2007 | Shimizu et al. |
| 2008/0244165 | A1 | 10/2008 | Kunimatsu |
| 2009/0083478 | A1 | 3/2009 | Kunimatsu et al. |
| 2010/0023682 | A1 * | 1/2010 | Lee et al. ..................... 711/103 |
| 2010/0064111 | A1 | 3/2010 | Kunimatsu et al. |
| 2010/0185804 | A1 | 7/2010 | Omizo et al. |
| 2012/0191900 | A1 | 7/2012 | Kunimatsu et al. |
| 2012/0246397 | A1 | 9/2012 | Nakai et al. |

FOREIGN PATENT DOCUMENTS

| | | |
|---|---|---|
| CN | 1276887 A | 12/2000 |
| CN | 1547701 A | 11/2004 |
| CN | 101198937 A | 6/2008 |
| JP | 5-250263 | 9/1993 |
| JP | 7-146820 | 6/1995 |
| JP | 2000-347883 | 12/2000 |
| JP | 2001-266580 | 9/2001 |
| JP | 2008-242944 | 10/2008 |
| JP | 2010-66914 | 3/2010 |
| KR | 10-1998-0063489 A | 10/1998 |
| KR | 10-2006-0050585 A | 5/2006 |
| KR | 10-2009-0079012 A | 7/2009 |
| WO | WO 2011/086732 A1 | 7/2011 |

OTHER PUBLICATIONS

Office Action issued Aug. 16, 2012 in Korean Patent Application No. 10-2011-0023766 (with English-language translation).

(Continued)

*Primary Examiner* — Jae Yu (74) *Attorney, Agent, or Firm* — Oblon, Spivak, McClelland, Maier & Neustadt, L.L.P.

(57) ABSTRACT

According to one embodiment, an information processing device includes an OS and a virtual machine switching section. The OS accesses a hardware resource including a nonvolatile semiconductor memory and a semiconductor memory used as a cache memory of the nonvolatile semiconductor memory. The virtual machine switching section switches a virtual machine in exection from a first virtual machine to a second virtual machine while a cache process is executed, when cache miss in a process executed by the first virtual machine is detected.

14 Claims, 8 Drawing Sheets

(56) References Cited

OTHER PUBLICATIONS

U.S. Appl. No. 12/884,601, filed Sep. 17, 2010, Hiroto Nakai, et al.
U.S. Appl. No. 12/970,145, filed Dec. 16, 2010, Tsutomu Owa, et al.
Office Action mailed Jul. 19, 2013 in Chinese Patent Application No. 201110066858.4 (with English Translation).
Office Action issued Sep. 17, 2013, in Japanese Patent Application No. 2010-172048, filed Jul. 30, 2010, (with English-language Translation).

* cited by examiner

| Identification information of virtual machine | Status | Status ending time | Degree of priority |
|---|---|---|---|
| 131 | Execution proceeding | | High |
| 132 | Execution-enabled | | Low |
| 133 | Cache miss state of volatile semiconductor memory | 3 μsec | Medium |
| ⋮ | ⋮ | ⋮ | ⋮ |
| 13m | Garbage collection proceeding | 4 μsec | Medium |

| Index (produced on the basis of logical address) | Coloring information |
|---|---|
| | |

22

| Coloring information | | | | | |
|---|---|---|---|---|---|
| Static color information | | | | Dynamic color information | |
| Degree of significance | Static write frequency (SW_color) | Static read frequency (SR_color) | Data life (SL_color) | Data production time (ST_color) | Number of times of write (DWC_color) | Number of times of read (DRC_color) |

F I G. 9

INFORMATION PROCESSING DEVICE AND INFORMATION PROCESSING METHOD

CROSS-REFERENCE TO RELATED APPLICATIONS

This application is based upon and claims the benefit of priority from Japanese Patent Application No. 2010-172048, filed Jul. 30, 2010; the entire contents of which are incorporated herein by reference.

FIELD

Embodiments described herein relate generally to an information processing device and information processing method using a virtualization technology.

BACKGROUND

In a general information processing device, as a main memory of a processor, for example, a volatile semiconductor memory such as a Dynamic Random Access Memory (DRAM) or the like is used. Furthermore, in a conventional information processing device, a nonvolatile semiconductor memory is used as a secondary memory device in combination with a volatile semiconductor memory. Further, a virtualization technology is used for an information processing device.

DETAILED DESCRIPTION

In general, according to embodiments, an information processing device includes an operating system, first and second virtual machines, a cache-miss detection section, a cache control section, a virtual machine switching section. The operating system accesses a hardware resource including a nonvolatile semiconductor memory and a semiconductor memory used as a cache memory of the nonvolatile semiconductor memory. The first and second virtual machines operate on the operating system. The cache-miss detection section detects cache miss to the semiconductor memory in a process executed by the first virtual machine. The cache control section executes a cache process when the cache-miss detection section detects the cache miss in the process. The virtual machine switching section, when the cache-miss detection section detects the cache miss in the process executed by the first virtual machine, switches a virtual machine in execution from the first virtual machine to the second virtual machine while the cache control section executes the cache process.

Embodiments will be explained below with reference to accompanying drawings. In the drawings, the same reference numbers and symbols denote the same or substantially same elements, and a description thereof will be omitted or briefly described. Only different parts will be explained in detail.

(First Embodiment)

Figure 1:
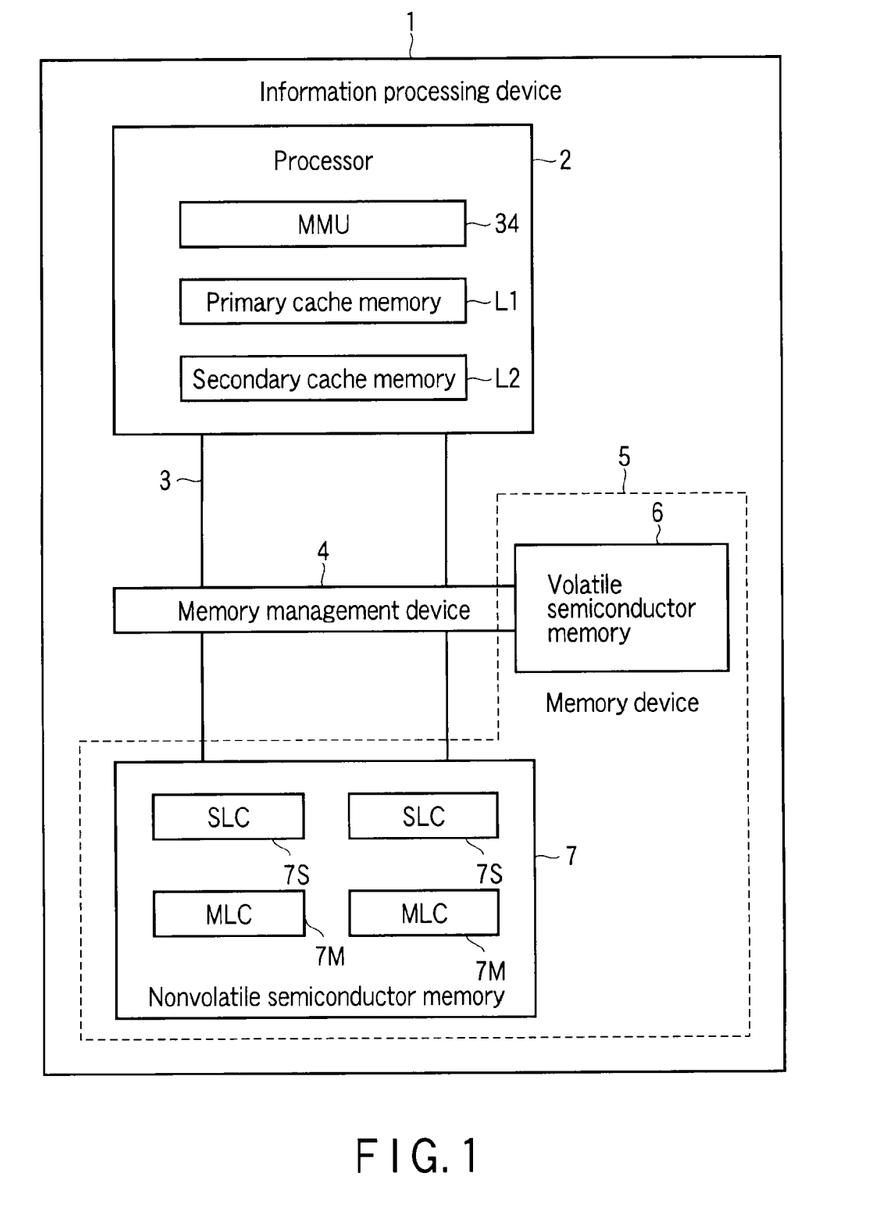
FIG. 1 is a block diagram showing an example of a configuration of an information processing device according to a first embodiment.

FIG. 1 is a block diagram showing a configuration example of an information processing device according to this embodiment.

The information processing device 1 includes a processor 2, bus 3, memory management device 4, volatile semiconductor memory 6, and nonvolatile semiconductor memory 7.

In this embodiment, although a description will be given by taking a case where the information processing device 1 is provided with one processor 2 as an example, the information processing device 1 may have the multiprocessor architecture provided with a plurality of processors 2.

The processor 2 and memory management device 4 are connected to each other via the bus 3 so that the processor 2 and memory management device 4 can transmit/receive data to/from each other. For example, the processor 2 and memory management device 4 can operate asynchronously and, while the processor 2 is executing processing, the memory management device 4 can execute wear leveling, garbage collection, and compaction with respect to the nonvolatile semiconductor memory 7.

For example, the volatile semiconductor memory 6 and nonvolatile semiconductor memory 7 (hereinafter generically referred to as the "memory device 5") may be used by the processor 2 as a main memory. Furthermore, the nonvolatile semiconductor memory 7 is also used as a file device (secondary memory device). The volatile semiconductor memory 6 is used as a cache memory of the nonvolatile semiconductor memory 7.

In this embodiment, as the volatile semiconductor memory 6, a memory used as a main memory in a computer, such as a Dynamic Random Access Memory (DRAM), Fast Page Mode DRAM (FPM-DRAM), Extended Data Out DRAM (EDO-DRAM), Synchronous DRAM (SDRAM) or the like is used. It should be noted that a nonvolatile random access memory which enables high-speed random access of the same degree as a DRAM, and has no substantial limit for the access-enabled upper limit number of times, such as a Magnetoresistive Random Access Memory (MRAM), Ferroelectric Random Access Memory (FeRAM) or the like may be employed in place of the volatile semiconductor memory 6.

In this embodiment, the nonvolatile semiconductor memory 7 includes a first memory, and second memory. The first memory has a larger access-enabled upper limit number of times than the second memory. Here, attention should be paid to that the access-enabled upper limit number of times implies an expected value which is statistically presumed, and does not mean that the relationship is always guaranteed.

It is assumed that the first memory included in the nonvolatile semiconductor memory 7 is, for example, a NAND flash memory 7S of Single Level Cells (SLC). It is assumed that the second memory included in the nonvolatile semiconductor memory 7 is, for example, a NAND flash memory 7M of Multi Level Cells (MLC).

The SLC is higher in reading/writing speed, higher in reliability, and higher in durability than the MLC. However, the SLC is higher in bit cost than the MLC, and is not suitable for enhancement of capacity. On the other hand, the MLC is lower in reading/writing speed, lower in reliability, and lower in durability than the SLC. However, the MLC is lower in bit cost than the SLC, and is suitable for enhancement of capacity.

It should be noted that the reliability implies a degree of unlikelihood of missing data occurring in a case where data is read from the memory device 5. Further, that durability is high implies that the access-enabled upper limit number of times is large, and that durability is low implies that the access-enabled upper limit number of times is small.

It should be noted that in this embodiment, although the nonvolatile semiconductor memory 7 is described as a NAND flash memory, the nonvolatile semiconductor memory 7 is not limited to the NAND flash memory, and may be other types of flash memories such as a NOR flash memory, Phase change memory (PRAM), Resistive Random Access Memory (ReRAM) or the like.

It should be noted that in this embodiment, although the nonvolatile semiconductor memory 7 includes the SLC NAND flash memory 7S, and MLC NAND flash memory, the nonvolatile memory 7 may include, for example, MLC NAND flash memory of 2 bit/cell, and MLC NAND flash memory of 3 bit/cell.

Further, the MLC may be employed as the second memory, and the MLC that can utilize a pseudo-SLC mode in which only a lower page of the MLC is used to carry out data write may be used as the first memory. In this case, it is possible to constitute the first memory and second memory by using only common chips, this being advantageous in manufacturing cost.

In this embodiment, the nonvolatile semiconductor memory 7 may be used as a main memory. In the case where the nonvolatile semiconductor memory 7 is utilized as the main memory, as compared with the case where the nonvolatile semiconductor memory 7 is utilized as a conventional secondary memory device (for example, a Solid State Drive (SSD) or the like), the frequency of access to the nonvolatile semiconductor memory 7 becomes higher, and a problem that the life (lifetime) of the nonvolatile semiconductor memory 7 becomes shorter is caused. In this embodiment, it is possible to solve the above-mentioned problem by managing the data allocation for the nonvolatile semi-conductor memory 7 and volatile semiconductor memory 6.

The memory management device 4 controls, for example, read, write, and erase carried out by the processor 2 with respect to the volatile semiconductor memory 6 and nonvolatile semiconductor memory 7.

It should be noted that the memory management device 4 may also be configured to be provided in the processor 2, and control read, write, and erase carried out by the processor 2 with respect to the volatile semiconductor memory 6 and nonvolatile semiconductor memory 7. In this embodiment, the data size of data to be written to or read from the volatile semiconductor memory 6 and nonvolatile semiconductor memory 7 is, for example, a page size, and erase size is a block size.

The processor 2 is provided with a Memory Management Unit (MMU) 34, primary cache memory L1, and secondary cache memory L2. The processor 2 is a processing device of various types such as a Central Processing Unit (CPU), Micro Processor Unit (MPU), Graphic Processor Unit (GPU) or the like.

The MMU 34 is provided with various functions such as a function of address translation from/to a virtual address to/from a physical address. Further, the MMU 34 carries out cache control of temporarily storing data (processing target data) to be processed by the processor 2 in the primary cache memory L1 or secondary cache memory L2.

The various processing operations of the memory management device 4 can also be executed by memory management software 10 to be described later. In this case, the memory management device 4 may not be constituted of hardware. Further, the processing operations of the memory management device 4 may also be carried out by sharing of burdens between the memory management device 4 and memory management software 10.

Figure 2:
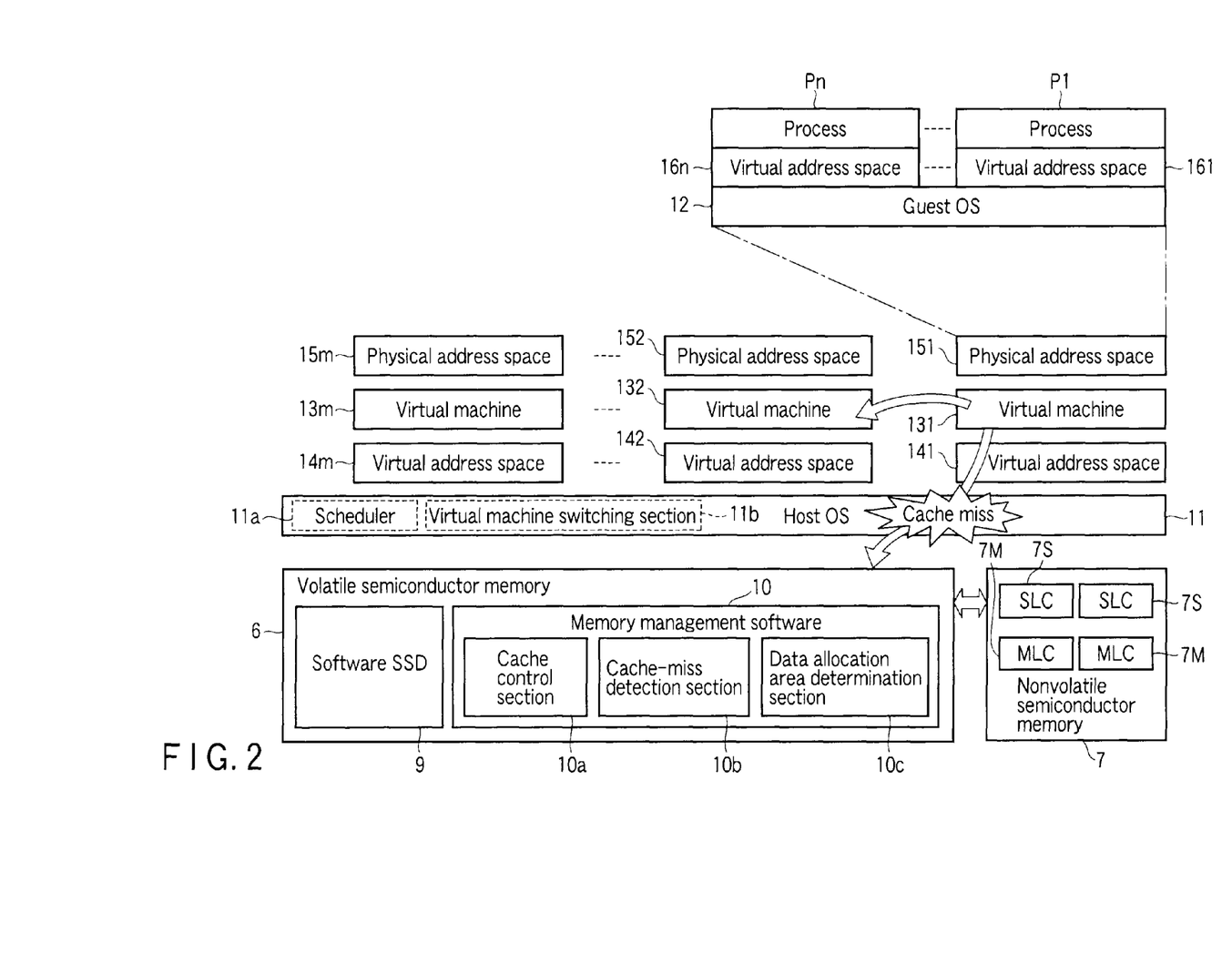
FIG. 2 is a block diagram showing an example of a software configuration executed by the information processing device according to the first embodiment.

FIG. 2 is a block diagram showing an example of a software configuration executed by the information processing device 1 according to this embodiment.

The information processing device 1 is provided with hardware resources including the aforementioned processor 2 (not shown in FIG. 2), volatile semiconductor memory 6, nonvolatile semiconductor memory 7, and the like. As described previously, the volatile semiconductor memory 6 is used as a cache memory of the nonvolatile semiconductor memory 7. In the volatile semiconductor memory 6, software SSD 9, and memory management software 10 are stored. Details of the software SSD 9, and memory management software 10 will be described later.

A host Operating System (OS) 11 is executed on the hardware resources. The host OS 11 has a function of providing a virtualized environment. Further, the host OS 11 is provided with a scheduler 11a, and virtual machine switching section 11b.

The host OS 11 provides a virtualized environment. By the virtualized environment provided by the host OS 11, a plurality of virtual machines 131 to 13m are realized on the host OS 11. On the virtual machine 131, a guest OS 12 is executed. On each of the virtual machines 132 to 13m too, a guest OS is executed likewise. On the guest OS 12, one or more processes P1 to Pn are processed. On each of the guest OSs on the virtual machines 132 to 13m too, one or more processes are processed likewise. The scheduler 11a manages an execution order of the plurality of virtual machines 131 to 13m on the host OS 11. In other words, the scheduler 11a manages the execution order of the plurality of guest OSs on the host OS 11. The virtual machine switching section 11b switches a virtual machine in execution (execution virtual machine) on the basis of the scheduler 11a on the host OS 11. Further, the virtual machine switching section 11b switches the execution virtual machine in accordance with a request from a cache-miss detection section 10b to be described later.

The processes P1 to Pn execute processing of data while accessing the primary cache memory L1 and secondary cache memory L2. When data to be processed is not present in the primary cache L1 and secondary cache L2 (cache miss in the primary cache L1 and secondary cache L2), the data to be processed is read from the volatile semiconductor memory 6 or the nonvolatile semiconductor memory 7. When the data to be processed is not present in the volatile semiconductor memory 6 (cache miss in the volatile semiconductor memory 6), cache miss occurs. As will be described later, cache miss in the volatile semiconductor memory 6 is detected by the cache-miss detection section 10b.

Each of the virtual machines 131 to 13m uses each of virtual address spaces 141 to 14m and physical address spaces 151 to 15m.

On the virtual machine 131, the guest OS 12, and processes P1 to Pn are executed, and virtual address spaces 161 to 16n are used.

The memory management software 10 is read from the volatile semiconductor memory 6, and is executed by the processor 2, whereby a memory management function including a cache control section 10a, the cache-miss detection section 10b, and a data allocation area determination section 10c is realized.

The cache control section 10a controls data caching from the nonvolatile semiconductor memory 7 to the volatile semiconductor memory 6. For example, data accessed by the processes P1 to Pn is cached from the nonvolatile semiconductor memory 7 to the volatile semiconductor memory 6. Thereby, it becomes possible for the processes P1 to Pn to read data from the volatile semiconductor memory 6 to which access can be made at higher speed than the nonvolatile semiconductor memory 7, and enhance the speed of access to data.

The cache-miss detection section 10b detects cache miss in the volatile semiconductor memory 6. As described previously, although the cache control section 10a caches data accessed from the processes P1 to Pn to the volatile semiconductor memory 6, when the data accessed from the processes P1 to Pn is not cached to the volatile semiconductor memory 6, cache miss occurs.

When data is newly generated in the processes P1 to Pn, the data allocation area determination section 10c determines an allocation area (write area) of the data. The data allocation area determination section 10c determines the allocation area in one of the volatile semiconductor memory 6, SLC NAND flash memory 7S of the nonvolatile semiconductor memory 7, and MLC NAND flash memory 7M thereof in accordance with the access frequency of the data.

The software SSD 9 is software configured to control the nonvolatile semiconductor memory 7 as an auxiliary memory.

As described above, in this embodiment, the volatile semiconductor memory 6, and nonvolatile semiconductor memory 7 are used as the main memory. Accordingly, when the volatile semiconductor memory 6 is accessed in the processes P1 to Pn, if cache miss occurs in the volatile semiconductor memory 6, data to be accessed must be read from the nonvolatile semiconductor memory 7. In this case, the speed of the access to the nonvolatile semiconductor memory 7 is lower than the speed of the volatile semiconductor memory 6, and hence there is the possibility of the latency becoming longer. In this embodiment, the following processing is carried out by using the cache-miss detection section 10b, virtual machine switching section 11b, and the like, whereby it is made possible to conceal the cache miss penalty in the volatile semiconductor memory 6.

Figure 3:
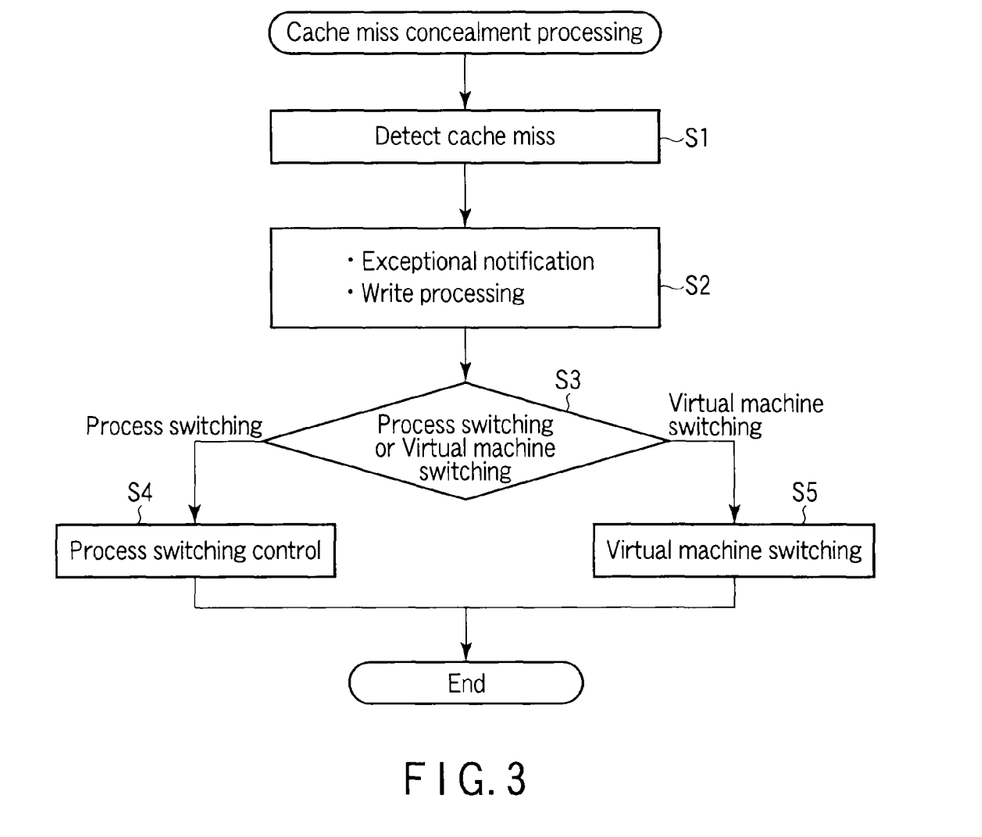
FIG. 3 is a flowchart showing an example of cache miss concealment processing of the information processing device according to the first embodiment.

Hereinafter, an operation of concealing the cache miss penalty will be described with reference to FIG. 3.

First, when cache miss occurs in the volatile semiconductor memory 6, the cache-miss detection section 10b detects the cache miss in the volatile semiconductor memory 6 (step S1).

Subsequently, the cache-miss detection section 10b gives exceptional notification to the host OS 11, and cache control section 10a carries out processing of writing data which has caused the cache miss from the nonvolatile semiconductor memory 7 to the volatile semiconductor memory 6 (step S2).

Then, the host OS 11 selects process switching or virtual machine switching by taking a time required for the write processing in step S2 into consideration (step S3).

When the time required for a cache process is shorter than or equal to a reference time, and the process switching is selected, the host OS 11 notifies the guest OS 12 of the process switching. Thereby, the guest OS 12 switches a cache miss occurrence process, i.e., corresponding one of the processes P1 to Pn, and executes a no cache miss occurrence process (step S4). It should be noted that instead of switching the cache miss occurrence, a cache miss occurrence thread in the process may be switched, and a no cache miss occurrence thread may be executed.

When the time required for the cache process is longer than the reference time, and the virtual machine switching is selected, the host OS 11 switches the execution virtual machine from a cache miss occurrence virtual machine 131 to a no cache miss occurrence virtual machine 132 (step S5).

When the cache miss in the volatile semiconductor memory 6 is detected as in the case of step S4 or S5, cache miss penalty is concealed by switching the process (or thread) or the virtual machine.

When cache miss is occurred in a virtual machine before switching, for example, the host OS 11 causes a virtual machine after switching to take over executable processing from the cache miss occurrence virtual machine.

Further, not only when cache miss is occurred in the volatile semiconductor memory 6, but also when the memory management device 4 (or memory management software 10) is executing garbage collection or compaction with respect to the nonvolatile semiconductor memory 7, the host OS 11 carries out switching of the virtual machine, and carries out concealment of the penalty of the garbage collection or compaction. Accordingly, in this embodiment, it is possible for the memory management device 4 (or memory management software 10) to partially execute garbage collection or compaction with respect to the nonvolatile semiconductor memory 7.

Figure 4:
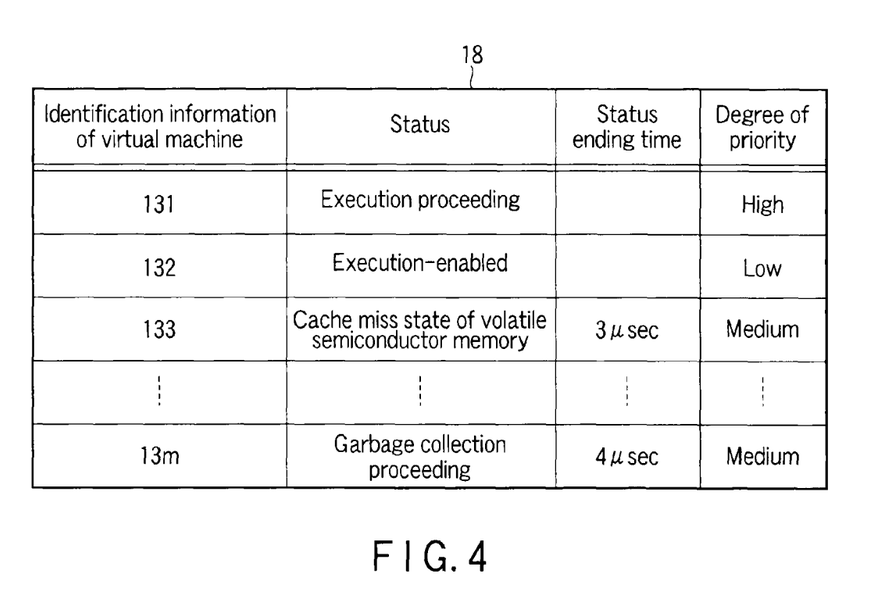
FIG. 4 is a view showing an example of a table used in a scheduler of a host OS according to the first embodiment.

FIG. 4 is a view showing an example of a table used in the scheduler 11a of the host OS 11 according to this embodiment.

The host OS 11 manages the table 18 by using, for example, the volatile semiconductor memory 6 or the nonvolatile semiconductor memory 7.

The table 18 includes, for example, as items, identification information of the virtual machines 131 to 13m, a status representing the state of each of the virtual machines 131 to 13m, ending time of the status, and the degree of priority of each of the virtual machines 131 to 13m. The ending time of the status may be used as a time to become execution-enabled (a time for enable).

The host OS 11 registers the identification information of each of the virtual machines 131 to 13m in the table 18.

The host OS 11 registers the degree of priority of each of the virtual machines 131 to 13m in the table 18. As the degree of priority, a value set in advance for each of the virtual machines 131 to 13m may be used. Further, the degree of priority may be set by the host OS 11 in accordance with a degree of use of a user, and type of an executed processing. For example, for a virtual machine in which the degree of use of the user is higher, the degree of priority is made higher, and for a virtual machine in which the degree of use of the user is lower, the degree of priority is made lower.

The host OS 11 detects in which of, for example, a process execution proceeding state (in process execution), waiting state where no process is executed (execution-enabled state), state where data is being replaced due to cache miss (cache process execution state), state where garbage collection is in execution, and state where compaction is in execution, each of the virtual machines 131 to 13m is, and registers statuses indicating the detection results in the table 18.

When each of the virtual machines 131 to 13m is in one of the cache process execution state, garbage collecting state, and compaction executing state, the host OS 11 predicts the status ending time at which the status ends, and registers the predicted status ending time in the table 18. It should be noted that the status ending time is, for example, an ending time of data replacement based on, for example, cache miss, garbage collection or compaction. In place of the status ending time, remaining time may be managed. It is possible for the host OS 11 to calculate the status ending time on the basis of "a memory area in which data is allocated, and which belongs to one of the volatile semiconductor memory 6, SLC NAND flash memory 7S, and MLC NAND flash memory 7M", "data size", and "data transfer speed of a case where data is transferred from the memory area in which the data is allocated to a memory area to which the data is to be relocated". As the predicted data transfer speed, an average value or the like of previously measured transfer speeds is used.

The scheduler 11a of the host OS 11 confirms the contents of the table 18, and determines one of the other virtual machines 132 to 13m the to be switched from the virtual machine 131 in which cache miss, garbage collection or compaction is occurred. For example, a virtual machine having the degree of priority "high", and in the state "execution-enabled" is selected.

In this embodiment, the calculation of the status ending time enables effective scheduling. For example, it is possible to preferentially select a virtual machine in the status "cache process execution state", having the degree of priority "high", and having a time difference between the present time and status ending time shorter than or equal to a threshold rather than a virtual machine in the status "execution-enable", and having the degree of priority "low". Thereby, it is possible to use the virtual machine which will soon finish data replacement due to the cache miss, and has the high degree of priority. That is, as a virtual machine to be selected, although a virtual machine in which no page fault is occurred is desirable, even a virtual machine in which a page fault is occurred can be selected if a time from now to the status ending time is short.

In this embodiment which has been described above, by switching of the virtual machine, even during data replacement due to cache miss, executable processing is executed by the other virtual machine. Thereby, it is possible to conceal cache miss penalty with respect to the volatile semiconductor memory 6, and realize improvement in the efficiency of processing carried out by the information processing device 1, and enhancement in the speed of the processing.

In this embodiment, not only when cache miss occurs in the volatile semiconductor memory 6, but also when partial garbage collection or compaction is executed by the memory management device 4 and memory management software 10, it is possible to conceal the penalty due to the partial garbage collection or compaction by switching the virtual machine.

In this embodiment, when cache miss penalty for the volatile semiconductor memory 6 cannot be concealed by switching of the process or the thread, switching of the virtual machine is carried out. Accordingly, it is possible to prevent the switching of the virtual machine from frequently occurring.

In this embodiment, access processing such as write, read, erase, and the like associated with the memory device 5 is managed by the memory management device 4 which is hardware, and the software SSD 9 and the memory management software 10 which are software. As described above, part of the access processing is realized by software, whereby it is possible to simplify the hardware configuration, and realize high-level processing.

(Second Embodiment)

In this embodiment, a modification example of the above-mentioned first embodiment will be described. In this embodiment, coloring information including the number of times of read, number of times of write, read frequency, write frequency and the like is used to carry out wear leveling.

Figure 5:
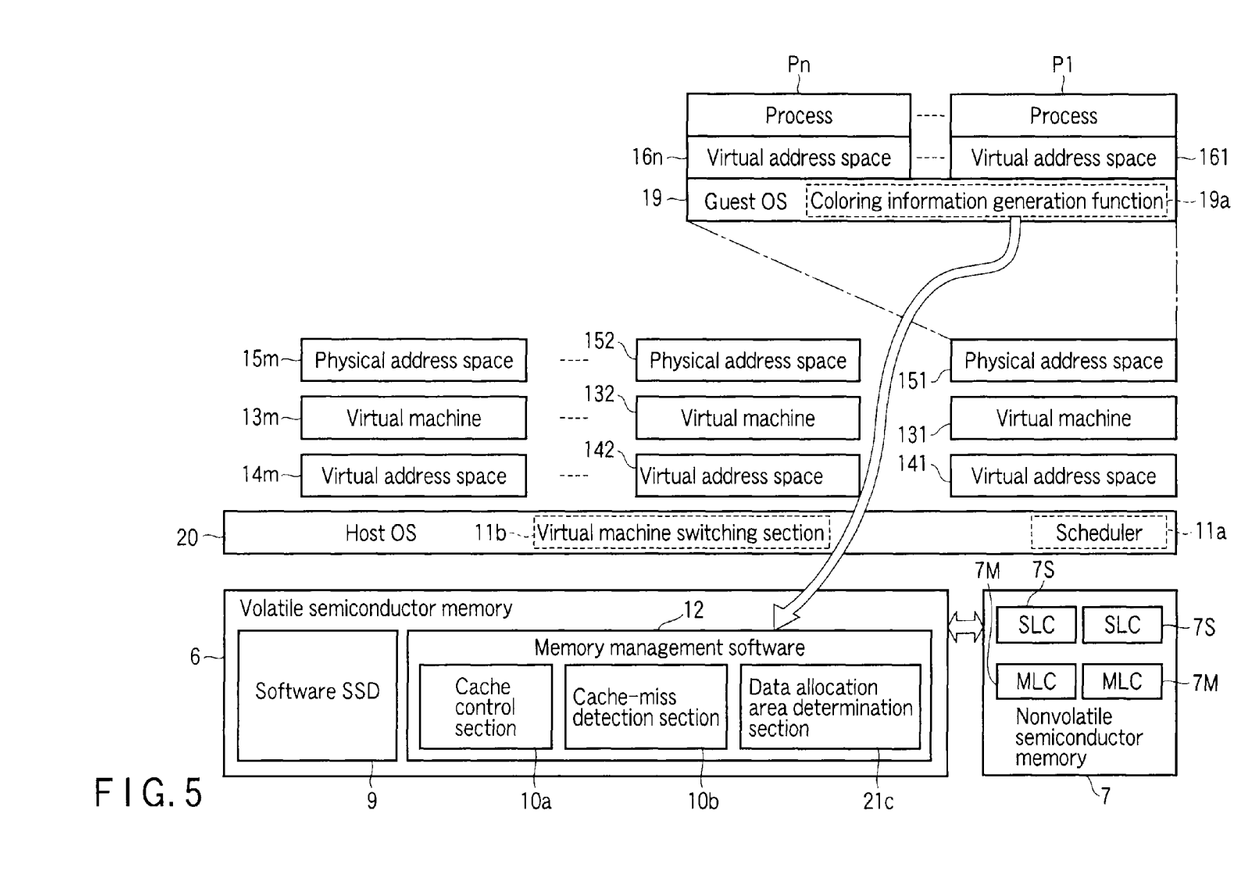
FIG. 5 is a block diagram showing an example of a configuration of an information processing device according to a second embodiment.

FIG. 5 is a block diagram showing an example of a configuration of an information processing device according to this embodiment.

A guest OS 19 includes a coloring information generation function 19a which generates coloring information of each data. Further, the guest OS 19 transmits the generated coloring information to a host OS 20. The guest OS 19 and host OS 20 transmit/receive coloring information to/from each other in accordance with a coloring information communication interface.

Memory management software 21 according to this embodiment is read from the volatile semiconductor memory 6, and is executed by the processor 2, thereby realizing a memory management function including a cache control section 10a, cache-miss detection section 10b, and data allocation area determination section 21c.

For example, when data is newly generated in processes P1 to Pn, the data allocation area determination section 21c determines an allocation area (write area) of the data. The data allocation area determination section 21c determines the allocation area in at least one of the volatile semiconductor memory 6, SLC NAND flash memory 7S of the nonvolatile semiconductor memory 7, and MLC NAND flash memory 7M of the nonvolatile semiconductor memory 7 on the basis of the coloring information.

The memory management software 21 and memory management device 4 carry out wear leveling on the basis of the coloring information. For example, the memory management software 21 and memory management device 4 allocates data of a high write frequency in the volatile semiconductor memory 6 by a choice between the volatile semiconductor memory 6, and nonvolatile semiconductor memory 7. Further, for example, the memory management software 21 and memory management device 4 store data of a high write frequency in the SLC NAND flash memory 7S of the nonvolatile semiconductor memory 7 by a choice between the SLC NANMD flash memory 7S and MLC NAND flash memory 7M of the nonvolatile semiconductor memory 7.

It should be noted that the host OS 20 of this embodiment may execute control of changing a memory area of the SLC NAND flash memory 7S of the nonvolatile semiconductor memory 7 to the MLC NAND flash memory 7M of the memory 7, and control of changing a memory area of the MLC NAND flash memory 7M of the nonvolatile semiconductor memory 7 to the SLC NAND flash memory 7S of the memory 7.

Figure 6:
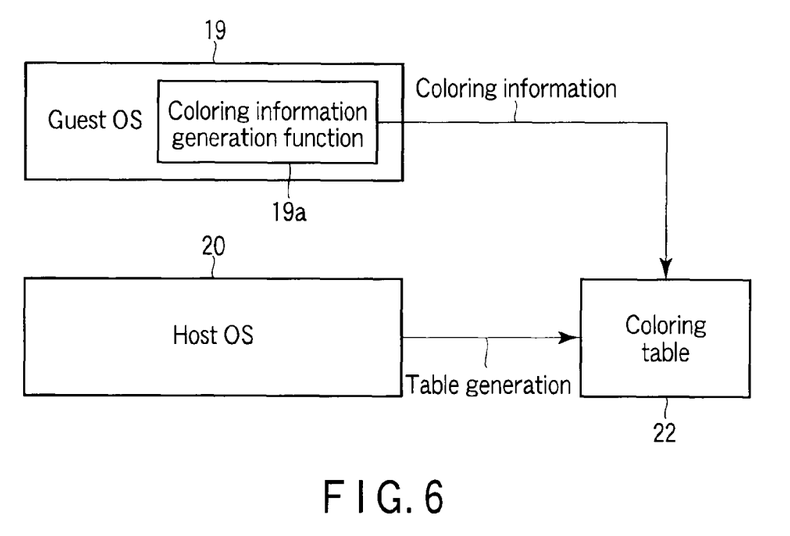
FIG. 6 is a block diagram showing an example of transmission/reception of coloring information between the guest OS and host OS according to the second embodiment.

FIG. 6 is a block diagram showing an example of transmission/reception of the coloring information between the guest OS 19 and host OS 20.

The host OS 20 generates a coloring table 22 as a memory map in any area of the memory device 5.

The coloring information generation function 19a of the guest OS 19 generates the coloring information of each data, and writes the coloring information onto the coloring table 22.

Figure 7:
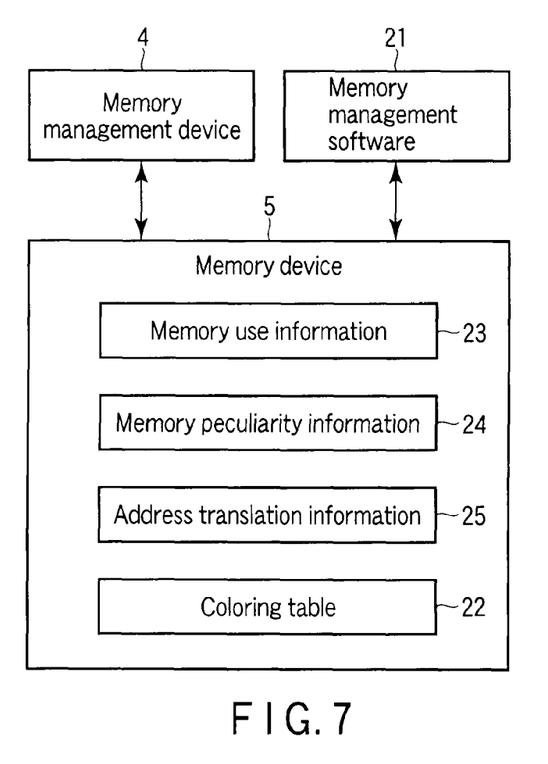
FIG. 7 is a block diagram showing an example of a relationship between a memory management device and memory management software, and various data stored in the memory device according to the second embodiment.

FIG. 7 is a block diagram showing an example of a relationship between the memory management device 4 and the memory management software 21, and various data stored in the memory device 5 according to this embodiment.

The memory management device 4, and memory management software 21 store memory use information 23, memory peculiarity information 24, address translation information 25, and the coloring table 22 in the memory device 5.

In the volatile semiconductor memory 6, part of the coloring table 22 stored in the nonvolatile semiconductor memories 7S and 7M may be stored. For example, among the contents of the coloring table 22 stored in the nonvolatile semiconductor memories 7S and 7M, coloring information which is frequently used may be stored in the volatile semiconductor memory 6. The memory management device 4, and memory management software 21 manage access to the memory device 5 by referring to the coloring table 22 and the like.

When the nonvolatile semiconductor memories 7S and 7M are utilized as the main memory, the frequency of access to the nonvolatile semiconductor memories 7S and 7M becomes higher than the case where the nonvolatile semiconductor memories 7S and 7M are utilized as a secondary memory device, and the life of each of the nonvolatile semiconductor memories 7S and 7M becomes shorter. In this embodiment, an information processing device provided with the memory device 5 formed by compounding the volatile semiconductor memory 6, SLC nonvolatile semiconductor memory 7S, MLC nonvolatile semiconductor memory 7M into a main memory, is realized. The memory device 5 is a main memory of the heterogeneous composition type, in which allocation of data is managed by the memory management device 4, and memory management software 21.

The memory use information 23 includes the number of times of write occurrence, and number of times of read occurrence of each page area of the nonvolatile semiconductor memories 7S and 7M, number of times of erase of each block area, and size of an in-use area.

The memory peculiarity information 24 includes a memory size of the volatile semiconductor memory 6, memory size of each of the nonvolatile semiconductor memories 7S and 7M, page size and block size of each of the nonvolatile semiconductor memories 7S and 7M, and access-enabled upper limit number of times (write-enabled upper limit number of times, read-enabled upper limit number of times, and erase-enabled upper limit number of times) of each memory area. Here, the page size implies a unit of the data size of read or write of the nonvolatile semiconductor memories 7S and 7M. The block size implies a unit of the data erase size of the nonvolatile semiconductor memory 7. In the nonvolatile semiconductor memory 7, the block size is larger than the page size.

The address translation information 25 is information for translating a logical address given from the processor 2 into a physical address corresponding to the logical address.

The coloring table 22 is a table in which coloring information for each data is held. The coloring information includes static color information and dynamic color information.

Figure 8:
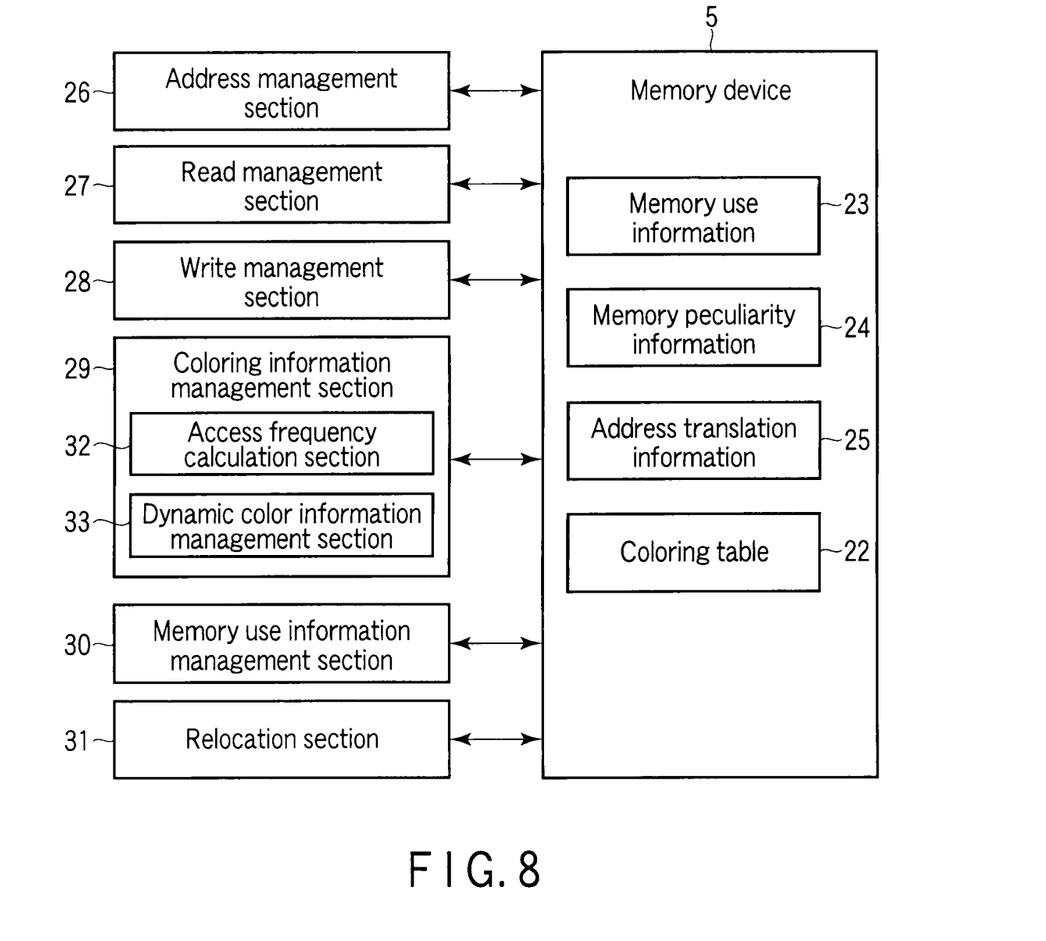
FIG. 8 is a block diagram showing an example of various processing sections realized by the memory management device and memory management software according to the second embodiment.

FIG. 8 is a block diagram showing an example of various processing sections realized by the memory management device 4 and memory management software 21 according to this embodiment.

The memory management device 4 and memory management software 21 includes an address management section 26, read management section 27, write management section 28, coloring information management section 29, memory use information management section 30, and relocation section 31. Furthermore, the coloring information management section 29 includes an access frequency calculation section 32, and dynamic color information management section 33.

The address management section 26 allocates a physical address to a logical address, and stores the allocation result in the address translation information 25. Thereby, the memory management device 4 and memory management software 21 can acquire a physical address corresponding to a logical address by referring to the address translation information 25.

When the processor 2 issues a read request, the read management section 27 manages read processing of data to be read with respect to the memory device 5.

When the processor 2 issues a write request, the write management section 28 manages write processing of data to be written with respect to the memory device 5.

The coloring information management section 29 manages the coloring table 22.

The memory use information management section 30 manages memory use information 23 of the memory device 5.

The relocation section 31 carries out relocation of data allocated in a physical address corresponding to an arbitrary logical address on the basis of coloring information included in the coloring table 22 out of synchronization with operations of the processor 2. The relocation section 31 periodically relocates data a read frequency or write frequency of which is high among data included in the nonvolatile semiconductor memory 7M to the nonvolatile semiconductor memory 7S on the basis of, for example, the dynamic color information. The relocation section 31 periodically relocates data a read frequency or write frequency of which is low among data included in the nonvolatile semiconductor memory 7S to the nonvolatile semiconductor memory 7M on the basis of, for example, the dynamic color information. Likewise, the relocation section 31 can carry out relocation of data between the volatile semiconductor memory 6, and nonvolatile semiconductor memories 7S and 7M. Regarding the write processing carried out by the write management section 28, relocation is carried out by carrying out determination processing of a write destination memory area, and determination processing of a write destination block area each time an update of data occurs.

The access frequency calculation section 32 calculates access frequency information (dynamic write frequency DW_color, dynamic read frequency DR_color) of data on the basis of the coloring information included in the coloring table 22.

The dynamic color information management section 33 manages dynamic color information included in the coloring table 22.

Figure 9:
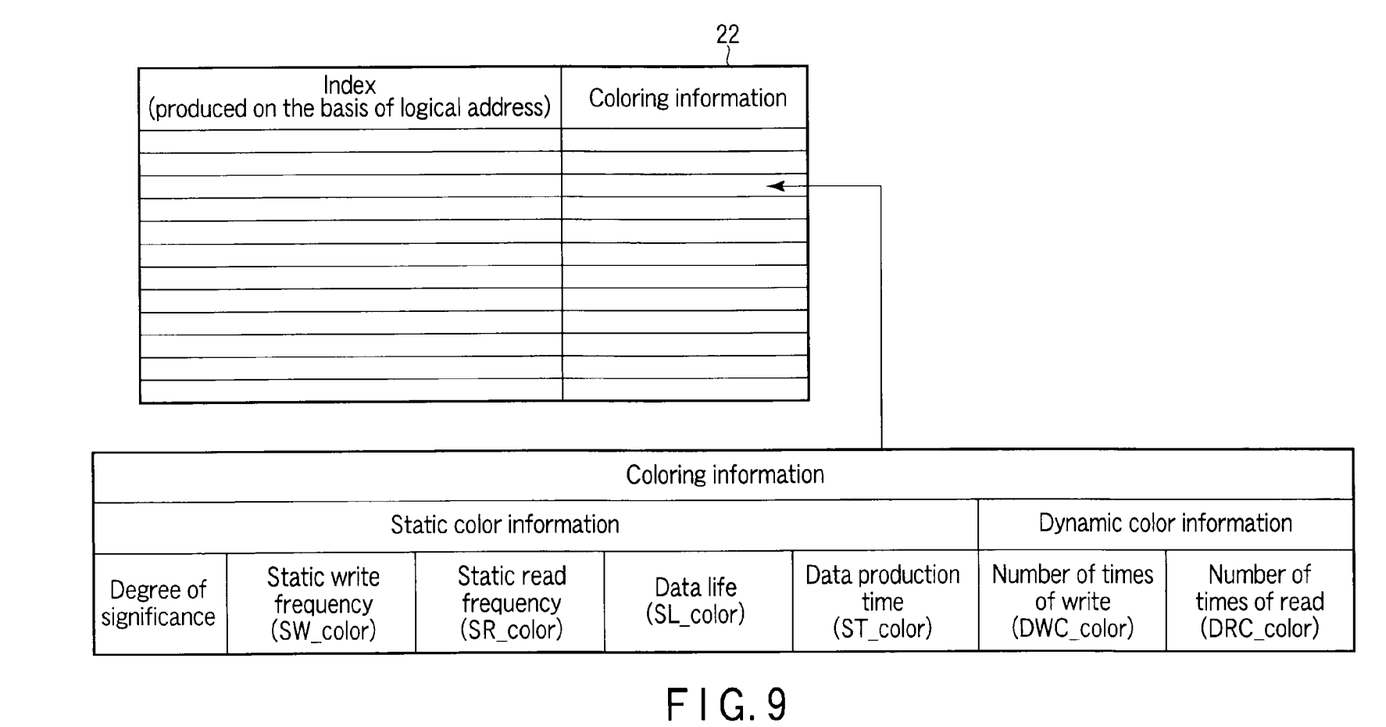
FIG. 9 is a view showing an example of a coloring information and coloring table according to the second embodiment.

FIG. 9 is a view showing an example of the coloring information and coloring table 22 according to this embodiment.

In this embodiment, coloring information is imparted to each data. The data size unit of data to which coloring information is imparted is, for example, the least unit of read/write. For example, the least unit of read/write is the page size of the NAND flash memory. In the following, although a description will be given on the assumption that the data size of data correlated with coloring information by the coloring table 22 is a page size, the data size is not limited to this.

In the coloring table 22, the coloring information is correlated with each data, and the coloring information is stored in units of entries. An index is imparted to each entry of the coloring table 22. The index implies a value produced on the basis of the logical address. When a logical address specifying data is given, the read management section 27, write management section 28, coloring information management section 29, relocation section 31, and the like refer to an entry managed by an index corresponding to the logical address to acquire coloring information of the data.

The coloring information is information used as a criterion for determining an allocation area of each data, and includes static color information, and dynamic color information. The static color information is information produced on the basis of a characteristic of the data to which coloring information is imparted, and is information serving as a hint for determining an allocation (write) area of the data on the memory device 5. The dynamic color information is information including at least one of the number of times, and frequency of read/write of data.

The static color information includes a degree of significance of the data, a value SW_color indicating the static write frequency, SR_color indicating the static read frequency, data life SL_color, and time ST_color at which data is produced.

The degree of significance implies a value set by assuming a significance of the data on the basis of the type or the like of the data. The degree of significance is assumed on the basis of, for example, a characteristic of a file held in a file system or a characteristic of an area primarily used for a program.

The static write frequency SW_color implies a value set by assuming a frequency at which the data is written on the basis of the type or the like of the data. The static read frequency SR_color implies a value set by assuming a frequency at which the data is read on the basis of the type or the like of the data. For example, regarding the static write frequency SW_color, a greater value is set for data the write frequency of which is assumed to be higher. For example, regarding the static read frequency SR_color, a greater value is set for data the read frequency of which is assumed to be higher.

The data life SL_color implies a value set by assuming a period (life of data) in which the data is used as data without being deleted on the basis of the type or the like of the data.

The static color information is a value statically predetermined by a program (process) producing data. Further, the guest OS 12 may predict the static color information on the basis of a file extension, file header or the like of data.

The dynamic color information includes the number of times of write of data DWC_color, and number of times of read of data DRC_color. Here, the number of times of write of data DW_color implies the number of times of write of the data for the memory device 5. The number of times of read of data DRC_color implies the number of times of read of the data from the memory device 5. The dynamic color information management section 33 manages the number of times of write of the data for the memory device 5 on the basis of the number of times of write of data DWC_color for each data. The dynamic color information management section 33 manages the number of times of read of the data from the memory device 5 on the basis of the number of times of read of data DRC_color for each data. As described previously, the memory device 5 is used as the main memory. Accordingly, data processed by the processor 2 is written to the memory device 5, and is read from the memory device 5. The dynamic color information management section 33 increments the number of times of write of data DWC_color by one each time the data is written. Further, the dynamic color information management section 33 increments the number of times of read of data DRC_color by one each time the data is read.

The access frequency calculation section 32 calculates a dynamic write frequency DW_color based on the number of time of write of data DWC_color. The access frequency calculation section 32 calculates a dynamic read frequency DR_color based on the number of time of read of data DRC_color.

The dynamic write frequency DW_color implies a value indicating a data write frequency for the memory device 5. The dynamic read frequency D_color implies a value indicating a data read frequency from the memory device 5.

Here, a method of calculating the dynamic write frequency DW_color and dynamic read frequency DR_color on the basis of the dynamic color information and static color information will be described below.

When new data is produced at a data production time, coloring information (including the data production time) is produced for the newly produced data, is registered in a new entry of the coloring table 22, and the data is written to the memory device 5. After the data production time, access (read, write) to this data occurs, whereby the number of times of access (number of times of write DWC_color, number of times of read DRC_color) increases with the elapse of time. The increase in the number of times of access is carried out by the dynamic color information management section 33. The access frequency calculation section 32 realized by at least one of the memory management device 4 and memory management software 21 calculates the dynamic write frequency DW_color and dynamic read frequency DR_color based on the number of times of access.

The number of times of write of the data DWC_color and number of times of read of the data DRC_color at the current time can be obtained by referring to the coloring table 22. For example, the dynamic write frequency DW_color at the current time is obtained by temporally averaging the number of times of write of the data DWC_color from the data production time ST_color to the current time. Further, for example, the dynamic read frequency DR_color at the current time is obtained by temporally averaging the number of times of read of the data DRC_color from the data production time ST_color to the current time. Thereby, the dynamic write frequency DW_color and dynamic read frequency DR_color of the data are calculated based on the dynamic color information (the number of times of write DWC_color, and number of times of read DRC_color).

The write management section 28 determines a memory area to be used when data to be written is written to the memory device 5 on the basis of the memory use information 23, memory peculiarity information 24, and coloring table 22, and writes the data to be written to the determined memory area.

For example, the write management section 28 calculates the degree of wear (exhaustion) (=number of times of write/write-enabled upper limit number of times) for each memory area of the memory device 5, and writes data of a low dynamic write frequency to a memory area of a high degree of wear.

For example, the write management section 28 writes data of a high dynamic write frequency to a memory area of a low degree of wear.

For example, the write management section 28 writes data the dynamic read frequency or the dynamic write frequency of which is "high" to a memory area of the volatile semiconductor memory 6, writes data the dynamic read frequency or the dynamic write frequency of which is "medium" to a memory area of the SLC NAND flash memory 7S, and writes data the dynamic read frequency or the dynamic write frequency of which is "low" to a memory area of the MLC NAND flash memory 7M.

When the memory area to which the data is to be written is determined by the above-mentioned processing, the write management section 28 determines a physical address of the write destination. In this case, the write management section 28 refers to the coloring table 22 to appropriately select the physical address of the write destination, thereby preventing wear leveling from occurring, and reducing unnecessary erase processing.

Here, the wear leveling implies, for example, exchanging data between blocks in such a manner that a difference in the number of times of erase between a block in which the number of times of erase is the largest, and block in which the number of times of erase is the smallest falls within a predetermined threshold. For example, in the NAND flash memory, overwriting of data is not enabled without erase processing, and hence the transfer destination of data must be an unused block, thereby involving occurrence of erase processing of a block originally storing data therein.

It should be noted that in this embodiment, an SLC memory area may be switched to an MLC memory area or an MLC memory area may be switched to an SLC memory area in accordance with the calculated degree of wear of each memory area.

In this embodiment described above, processing of write, read, and erase associated with the memory device 5 is controlled by the memory management device 4 which is hardware, and memory management software 21 which is software.

In this manner, part of the processing of write, read, and erase associated with the memory device 5 is executed by software, whereby it is possible to execute sophisticated and high level wear leveling of a high degree of freedom, prevent a state where only part of a memory area of the memory device 5 is deteriorated from occurring, and realize achievement of a long life of the memory device 5.

In this embodiment, the coloring information is transmitted from the guest OS 19 to the memory management software 21. Therefore, efficient and sophisticated wear leveling can be carried out on the basis of the coloring information.

It should be noted that in this embodiment, the memory management software 21 may be made part of the host OS 20.

(Third Embodiment)

In this embodiment, the software SSD 9 according to the first and second embodiments will be described below.

The software SSD 9 is software configured to control the nonvolatile semiconductor memory 7 as an SSD.

The SSD used as an auxiliary memory is normally connected to the processor via a chip set (southbridge, northbridge). For example, the SSD is connected to the southbridge by a Serial Advanced Technology Attachment (SATA) interface.

In this embodiment, the nonvolatile semiconductor memory 7 is connected to the processor 2 via the memory management device 4. The nonvolatile semiconductor memory 7 is connected to the memory management device 4 by, for example, PCIexpress, and is used as the auxiliary memory.

When the nonvolatile semiconductor memory 7 is used as an SSD (auxiliary memory), the software SSD 9 can realize sophisticated wear leveling by using the coloring information.

On the other hand, for example, even when the guest OS is a versatile guest OS 12 having no coloring information generation function 19a, and coloring information is not transmitted from the guest OS 12, the software SSD 9 can recognize the type of a file to which data belongs, identifier, and the like by referring to a File Allocation Table (FAT). Accordingly, the software SSD 9 can produce information equivalent to the coloring information (for example, static color information or the like) for data on the basis of the information of the FAT, and realize sophisticated wear leveling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
an operating system which accesses a hardware resource including a nonvolatile semiconductor memory and a semiconductor memory used as a cache memory of the nonvolatile semiconductor memory;
first and second virtual machines operating on the operating system;
a cache-miss detection section which detects cache miss to the semiconductor memory in a process executed by the first virtual machine;
a cache control section which executes a cache process when the cache-miss detection section detects the cache miss in the process; and
a virtual machine switching section which, when the cache-miss detection section detects the cache miss in the process executed by the first virtual machine, switches a virtual machine in execution from the first virtual machine to the second virtual machine while the cache control section executes the cache process,
wherein the operating system selects process switching when a time required for the cache process is shorter than or equal to a reference time, and selects virtual machine switching when the time required for the cache process is longer than the reference time.

2. The information processing device of claim 1, wherein the nonvolatile semiconductor memory is used as a main memory.

3. The information processing device of claim 1, further comprising:
first and second guest operating systems operating on each of the first and second virtual machines; and
an allocation determination section which determines an allocation area of data in at least one of the nonvolatile semiconductor memory and the semiconductor memory when writing the data, wherein
the first and second guest operating systems generate access frequency information on the data, the data being processed in the process executed on the operating system, and
the allocation determination section determines the allocation area of the data based on the access frequency information.

4. The information processing device of claim 3, wherein the allocation determination section determines the allocation area based on the access frequency information and each degree of wear of memory area in the nonvolatile semiconductor memory.

5. The information processing device of claim 1, further comprising control software which is executed by a processor, the control software controlling the nonvolatile semiconductor memory to use as an auxiliary memory, and determining an allocation area of each data based on a file allocation table associated with the nonvolatile semiconductor memory or access frequency information of each data.

6. The information processing device of claim 1, wherein the virtual machine switching section comprises a management table managing an execution status of each of the first and second virtual machines, a time for enable, and a priority of execution, and switches the virtual machine in execution based on the management table.

7. The information processing device of claim 1, wherein the nonvolatile semiconductor memory includes a NAND flash memory of Single Level Cells and a NAND flash memory of Multi Level Cells.

8. The information processing device of claim 1, wherein the semiconductor memory is a volatile semiconductor memory.

9. An information processing device comprising:
an operating system which accesses a hardware resource including a nonvolatile semiconductor memory and a semiconductor memory used as a cache memory of the nonvolatile semiconductor memory;
first and second virtual machines operating on the operating system;
a cache-miss detection section which detects cache miss to the semiconductor memory in a process executed by the first virtual machine;
a cache control section which executes a cache process when the cache-miss detection section detects the cache miss in the process; and
a virtual machine switching section which, when the cache-miss detection section detects the cache miss in the process executed by the first virtual machine, switches a virtual machine in execution from the first virtual machine to the second virtual machine while the cache control section executes the cache process,
wherein the operating system selects thread switching when a time required for the cache process is shorter than or equal to a reference time, and selects virtual machine switching when the time required for the cache process is longer than the reference time.

10. An information processing method comprising:
operating first and second virtual machines on an operating system which accesses a hardware resource including a nonvolatile semiconductor memory and a semiconductor memory used as a cache memory of the nonvolatile semiconductor memory, by a processor;
detecting, by at least one of the processor and a memory management device, cache miss to the semiconductor memory in a process executed by the first virtual machine and, when the cache miss is detected, executing a cache process; and
switching a virtual machine in execution from the first virtual machine to the second virtual machine while the cache process is executed, by the at least one of the processor and the memory management device,
wherein the operating system selects process switching when a time required for the cache process is shorter than or equal to a reference time, and selects virtual machine switching when the time required for the cache process is longer than the reference time.

11. The information processing method of claim 10, wherein the nonvolatile semiconductor memory is used as a main memory.

12. The information processing method of claim 11, further comprising:
determining an allocation area of data in at least one of the nonvolatile semiconductor memory and the semiconductor memory, by the at least one of the processor and the memory management device, wherein
each of the first and second virtual machines operate first and second guest operating systems,
the first and second guest operating systems generate access frequency information on the data, the data being processed in the process executed on the operating system, and
the determining the allocation area determines the allocation area of the data based on the access frequency information.

13. The information processing method of claim 11, further comprising:
executing, by a processor, control software determining an allocation area of each data based on a file allocation table associated with the nonvolatile semiconductor memory or access frequency information of each data, the control software controlling the nonvolatile semiconductor memory to use as an auxiliary memory.

14. The information processing method of claim 11, wherein
the switching refers a management table managing an execution status of each of the first and second virtual machines, a time for enable, and a priority of execution, and switches the virtual machine in execution based on the management table.

* * * * *